(12) United States Patent
Chatufale

(10) Patent No.: US 7,004,452 B2
(45) Date of Patent: Feb. 28, 2006

(54) VALVE SEAL ASSEMBLIES AND METHODS

(75) Inventor: Vijay Chatufale, Missouri City, TX (US)

(73) Assignee: HP&T Products, Inc., Stafford, TX (US)

(*) Notice: Subject to any disclaimer, the term of this patent is extended or adjusted under 35 U.S.C. 154(b) by 119 days.

(21) Appl. No.: 10/670,942

(22) Filed: Sep. 25, 2003

(65) Prior Publication Data

US 2005/0067599 A1 Mar. 31, 2005

(51) Int. Cl.
*F16K 25/00* (2006.01)
(52) U.S. Cl. .............. 251/171; 251/172; 251/309; 251/329
(58) Field of Classification Search ........ 251/170–172, 251/174, 309, 326, 328, 329
See application file for complete search history.

(56) References Cited

U.S. PATENT DOCUMENTS

| | | | | |
|---|---|---|---|---|
| 3,114,561 A | * | 12/1963 | Creath et al. ............... | 277/555 |
| 4,434,967 A | * | 3/1984 | Vanderburg ................ | 251/328 |
| 4,741,509 A | * | 5/1988 | Bunch et al. ............... | 251/172 |
| 4,878,651 A | * | 11/1989 | Meyer, Jr. .................. | 251/172 |
| 5,029,812 A | * | 7/1991 | Haynes ...................... | 251/327 |
| 5,090,661 A | * | 2/1992 | Parks et al. ................ | 251/172 |
| 5,201,872 A | * | 4/1993 | Dyer .......................... | 251/172 |
| 5,341,835 A | * | 8/1994 | Lanning, II ................ | 251/328 |
| 5,533,738 A | * | 7/1996 | Hoffmann .................. | 251/174 |
| 5,624,101 A | * | 4/1997 | Beson ........................ | 251/172 |
| 5,727,775 A | * | 3/1998 | Rodger et al. ............. | 251/328 |
| 6,082,707 A | * | 7/2000 | Hosie et al. ............... | 251/172 |
| 6,260,822 B1 | * | 7/2001 | Puranik ..................... | 251/328 |
| 6,279,875 B1 | * | 8/2001 | Chatufale .................. | 251/174 |
| 6,664,572 B1 | * | 12/2003 | Chatufale .................. | 257/172 |

* cited by examiner

*Primary Examiner*—Tuan Nguyen
(74) *Attorney, Agent, or Firm*—Slater & Matsil, L.L.P.

(57) ABSTRACT

A method of sealing a valve engaging member to a valve body about a borehole and structure thereof. Two seal members disposed on either side of the valve engaging member include a seat member adjacent the valve engaging member and a pocket insert adjacent the seat member. The pocket inserts fit within first and second pockets of the valve body. A C-shaped seal ring is disposed between the seat member and pocket insert, and two U-shaped seal rings are disposed between the pocket insert and the valve body. One of the U-shaped seal rings between the pocket insert and the valve body functions both as a radial seal ring and a retaining ring.

23 Claims, 2 Drawing Sheets

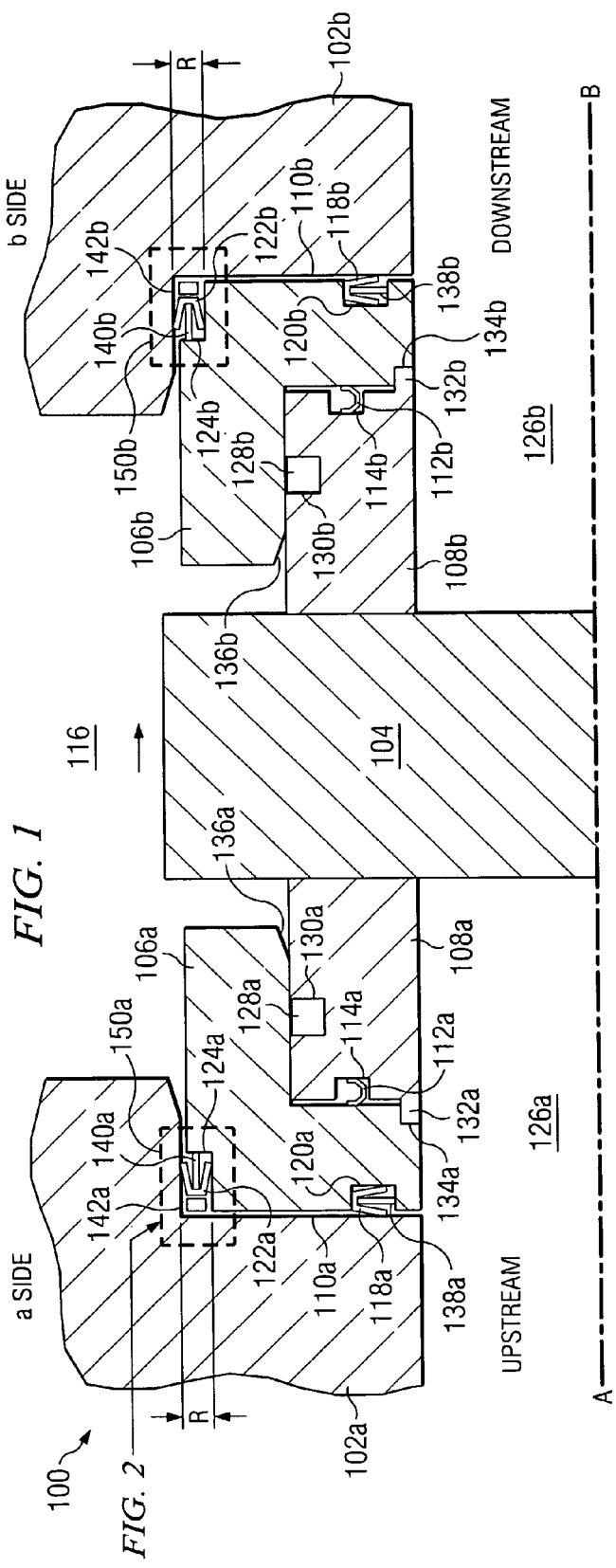
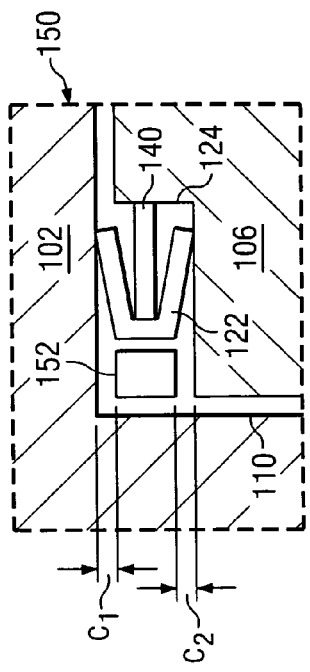

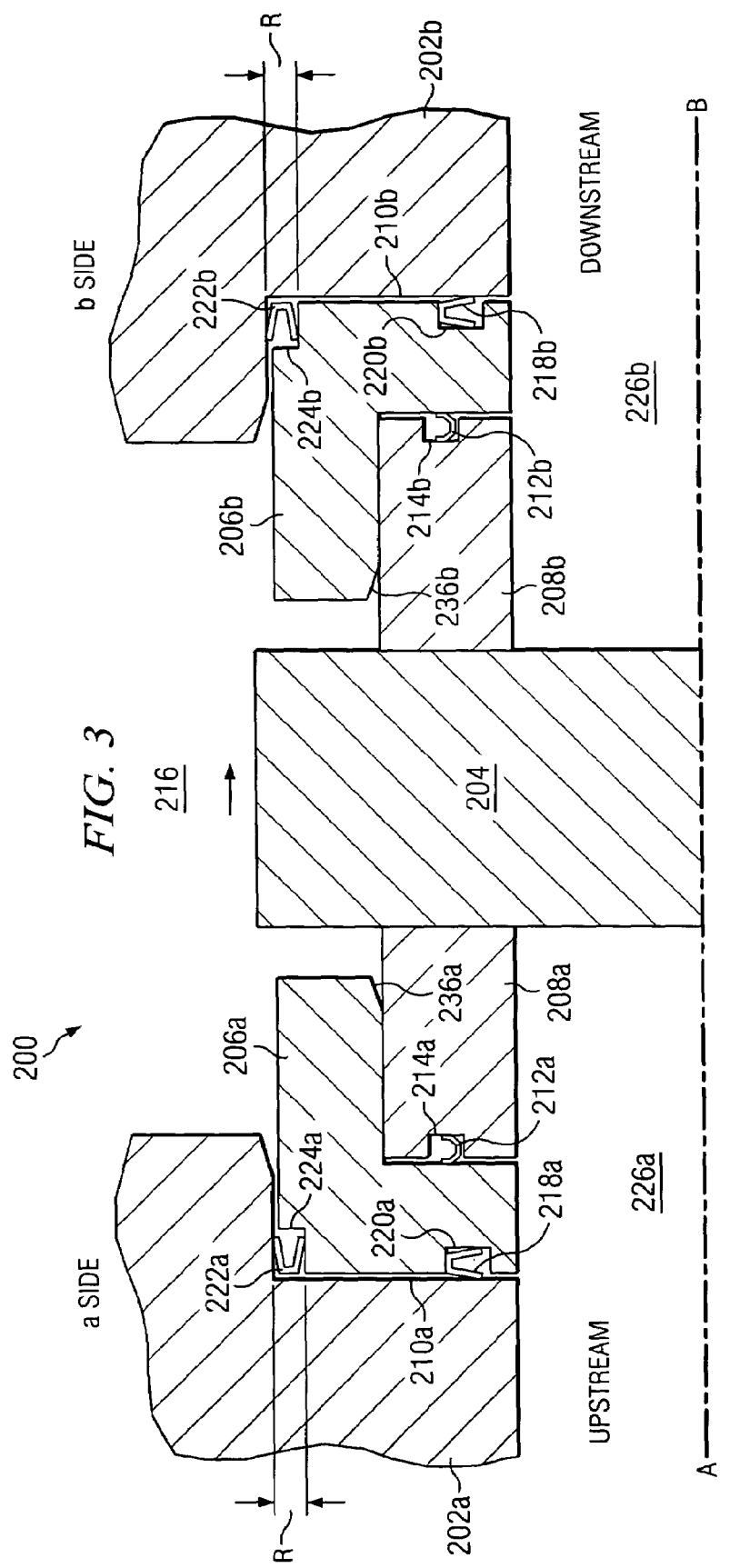

VALVE SEAL ASSEMBLIES AND METHODS

CROSS-REFERENCE TO RELATED APPLICATIONS

This application relates to the following commonly assigned patent application: Ser. No. 09/911,148, filed on Jul. 23, 2001, entitled "Valve Seal Assemblies and Methods," now U.S. Pat. No. 6,664,572, which application is hereby incorporated herein by reference.

TECHNICAL FIELD

The present invention relates generally to valves used in oilfield and, more particularly, to seal assemblies for valves and methods of sealing valves.

BACKGROUND

Various types of valves are used in oilfield well exploration, drilling, and production equipment. Valves are coupled to a pipeline and are typically used to shut off or turn on the flow of a fluid, such as a liquid, gas or both. Valves are typically either unidirectional or bi-directional. In a unidirectional valve, the valve has to be placed only in one unique way in a pipeline so as to match the pressure direction. In a bi-directional valve, either side of the valve can be used as the upstream side, which allows the valve to be placed in a pipeline without any specific side facing the direction of pressure. Valve sealing components are usually symmetrical for ease of installation and maintenance and to achieve bi-directionality.

A gate valve is a type of valve that includes a substantially rectangular-shaped gate that is moved by an operator in and out of the valve body to control the fluid. The operator may be manual or may be actuated hydraulically, pneumatically or electrically, for example. A gate valve also includes an annular or ring-shaped seat member that seals against the gate. Depending on gate valve design, one seat member may be disposed on either side of the gate, or alternatively, additional seat members may be disposed adjacent the seat member, which seat members are involved in the sealing of the valve. The additional seat members seal the passage between the seat member and body pocket.

A valve body pocket generally houses the seal assembly. A valve seal assembly generally includes sealing members such as the seat member adjacent the valve engaging member and other associated seat members which may be referred to as a body bushing or pocket insert, as examples. A seal assembly also generally includes at least one seal ring, which provides a seal between the various seat members, valve body pocket and the gate. Expanding gate valves utilize expanding gate assembly structures comprising a gate element and segment, which are adapted to expand transversely of one another against the sealing rings.

Another type of valve design is a plug valve, where a cylindrical plug having a bore in the center thereof is used to either block fluid flow, or to allow fluid to pass through the valve by rotating the plug. When the plug bore is aligned in parallel with the valve bore, the valve is open and fluid flows through the plug. When the plug bore is aligned perpendicular to the valve bore, the valve is closed and fluid is blocked from flowing through the plug.

Gate valves are classified as either downstream or upstream sealing. For downstream sealing gate valve designs, the sealing is done at the downstream side of the valve. The downstream side of the valve is the side farthest from the pressure source. Therefore, a valve having a downstream sealing design seals on the side of the valve farthest from the pressure source. In contrast, a valve having an upstream sealing design seals on the side of the valve closest to the pressure source.

Various types of seal assemblies have been devised for such valves. With many of these, such as where the seats are press-fit into seat pockets in the valve body, the seats must be installed or removed for repair purposes using special tools and associated costly procedures.

Several designs for valve seal assemblies and methods are described in commonly assigned patent application Ser. No. 09/911,148, filed on Jul. 23, 2001, entitled "Valve Seal Assemblies and Methods," now U.S. Pat. No. 6,664,572, which application is hereby incorporated herein by reference.

SUMMARY OF THE INVENTION

Embodiments of the present invention achieve technical advantages as a valve seal assembly having an improved seal arrangement. Two seal members include a seat member adjacent a valve engaging member, and a pocket insert adjacent the seat member. The pocket insert fits fixedly within the valve body. A seal ring is disposed between the seat member and pocket insert, and two U-shaped seal rings are disposed between the pocket insert and the valve body. One of the U-shaped seal rings between the pocket insert and the valve body functions both as a radial seal ring and a retaining ring.

In accordance with a preferred embodiment of the present invention, a seal assembly for a gate valve includes a valve engaging member and a valve body, the valve body having a first pocket. The seal assembly includes a first pocket insert disposed within the valve body first pocket, the first pocket insert being annular and having an L-shaped cross-section, a first seat member disposed telescopingly within the first pocket insert, the first seat member being adjacent the valve engaging member, and a first annular groove disposed at an exterior corner of the L-shaped cross-section of the first pocket insert. A first radial seal ring is disposed within the first annular groove of the first pocket insert adjacent the valve body first pocket, wherein the first radial seal ring provides a radial seal between the first pocket insert and the valve body first pocket.

In accordance with another preferred embodiment of the present invention, a seal assembly for a gate valve includes a valve engaging member and a valve body, the valve body having a first pocket and a second pocket. The seal assembly includes a first pocket insert disposed within the valve body first pocket, the first pocket insert being annular and having an L-shaped cross-section and a bottom surface, a first seat member disposed telescopingly within the first pocket insert, the first seat member being adjacent the valve engaging member and having a bottom surface, and a first annular groove disposed at an exterior corner of the L-shaped cross-section of the first pocket insert. A first radial seal ring is disposed within the first annular groove of the first pocket insert adjacent the valve body first pocket, wherein the first radial seal ring provides a radial seal between the first pocket insert and the valve body first pocket. A second pocket insert is disposed within the valve body second pocket, the second pocket insert being annular and having an L-shaped cross-section and a bottom surface. A second seat member is disposed telescopingly within the second pocket insert, the second seat member being adjacent the valve engaging member and having a bottom surface. A second annular groove is disposed at an exterior corner of the L-shaped cross-section of the second pocket insert, and a second radial seal ring is disposed within the second annular groove of the second pocket insert adjacent the valve body second pocket, wherein the second radial seal ring provides a radial seal between the second pocket insert and the valve body second pocket. A third annular groove is disposed within the bottom surface of the L-shaped first pocket insert, and a first seal ring is disposed within the third annular groove between the valve body first pocket and the first pocket insert. A fourth annular groove is disposed within the bottom surface of the first seat member, and a second seal ring is disposed within the fourth annular groove between the first pocket insert and the first seat member. A fifth annular groove is disposed within the bottom surface of the L-shaped second pocket insert, and a third seal ring is disposed within the fifth annular groove between the valve body second pocket and the second pocket insert. A sixth annular groove is disposed within the bottom surface of the second seat member, and a fourth seal ring is disposed within the sixth annular groove between the second pocket insert and the second seat member.

In accordance with yet another preferred embodiment of the present invention, a method of sealing a valve engaging member to a valve body about a borehole, the valve body having a pocket on either side of the valve engaging member, wherein the method includes providing a pocket insert having a substantially L-shaped cross-section within each valve body pocket, and providing a seat member disposed within each pocket insert coupled concentrically to each pocket insert around the valve borehole, the seat member sealingly coupled to the valve engaging member. A radial seal ring is coupled between each pocket insert and valve body pocket at the exterior corner of the L-shaped cross-section of each pocket insert, and a first seal ring is coupled between each pocket insert and the valve body pocket proximate the bore. The method includes coupling a second seal ring between each pocket insert and seating member.

Advantages of embodiments of the invention include providing an improved seal assembly for a valve engaging member. One of the seal rings between the pocket insert and the valve body pocket comprising a radial ring that retains the pocket insert within the valve body pocket, which reduces the number of components of the valve seal assembly, reduces labor, and reduces the cost of manufacturing. Fluid is prevented from entering between the pocket inserts and the valve body pockets, preventing erosion of the pockets of the valve body.

The foregoing has outlined rather broadly the features and technical advantages of embodiments of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 1 illustrates a cross-sectional view of a preferred embodiment of the present invention having first seat members and a second seat members disposed within a pocket of two valve bodies disposed on either side of a gate valve, wherein a radial seal is disposed between the first seat members and the valve body pockets;

FIG. 2 shows a more detailed view of the exterior corner region of the L-shaped first seat member of FIG. 1, including an optional back-up seal ring; and FIG. 3 shows a cross-sectional view of another preferred embodiment of the present invention.

Corresponding numerals and symbols in the different figures generally refer to corresponding parts unless otherwise indicated. The figures are drawn to clearly illustrate the relevant aspects of the preferred embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a valve sealing assembly for a gate valve. Embodiments of the present invention may also be applied, however, to other types of valve engaging members, for example. In the views shown in FIGS. 1 and 3, only half of the elements are shown; the elements shown are also disposed about a center-line A-B of the bore 126.

FIG. 1 illustrates a cross-sectional view of a preferred embodiment of the present invention, a valve seal assembly 100 having an upstream "a" side and a downstream "b" side. On the upstream "a" side, a first seat member 106a and a second seat member 108a provide a seal between a valve body 102a pocket 110a and a valve engaging member 104 which may comprise a gate 104. Alternatively, the valve engaging member 104 may comprise a plug or other types of engaging members, as examples.

On the downstream "b" side, a first seat member 106b and a second seat member 108b provide a seal between the valve body 102b pocket 110b and the valve engaging member 104. The second seat members 108a and 108b are adapted to make a metal-to-metal seal with the surfaces or faces of gate 104 that are perpendicular to the bore 126a/126b centerline A-B. Preferably, the valve seal assembly 100 components 106a/106b/108a/108b are symmetric, in order to provide a bi-directional valve. An engagement actuator (not shown) may be coupled to the gate 104 to raise and lower the gate 104 to unblock or block the bore 126a/126b and allow the flow of fluid through the bore 126a/126b. When the gate 104 is closed, the valve seal assembly 100 is adapted to seal at the downstream "b" side and prevent fluid from flowing downstream into the borehole 126b on the "b" side, to be described further herein.

The elements on both the "a" side and "b" side of the valve seal assembly 100 will next be described in more detail. For ease of discussion, where the "a" and "b" of the element numbers are omitted in the following discussion, both the "a" and "b" elements are being described (e.g., "108" refers to 108a and 108b).

The first seat member 106 is also referred to herein as a pocket insert 106. The pocket insert 106 comprises an annular member that is adapted to fit within valve body 102 at pocket 110. The pocket insert 106 is adapted to fixedly fit within valve body 102, rather than mechanically floating within valve body 102. The fixed coupling of the pocket insert 106 with the valve body pocket 110 may be accomplished by designing the dimensions of the pocket insert 106 such that there is an interference fit with the valve body pocket 110. Alternatively, the fixed coupling of pocket insert 106 to valve body pocket 110 may be achieved by the use of top seal ring 122, which functions as both a retainer ring and a radial seal ring, to be described further herein.

The second seat member 108 comprises an annular member that is adapted to fit in a telescoping manner within the pocket insert 106. The valve body 102, pocket insert 106, and seat member 108 preferably comprise steel and alternatively may comprise another material, preferably the same material as the pipe (not shown) that the valve seal assembly 100 is installed on, to prevent corrosion, for example. The cross-section of the pocket insert 106 is preferably substantially L-shaped, as shown. The pocket insert 106 is adapted to remain fixed within the pocket 110, while the seat member 108 is adapted to float mechanically. The pocket insert 106 may include a taper 136 at the entry thereof to facilitate the insertion of the seat member 108, for example.

In accordance with an embodiment of the invention, a single seal ring 112 is coupled between the pocket insert 106 and the seat member 108. The seat member 108 preferably comprises a groove 114 adapted to contain the seal ring 112. The seal ring 112 preferably comprises a 'C'-shaped ring, as shown. Preferably, the C-shaped seal ring 112 comprises metal. Alternatively, the seal ring 112 may comprise other seal rings having a square or rectangular cross-section and comprising a metal such as stainless steel, or a fluoropolymer resin, as examples. The metal seal ring 112 preferably has the form of the letter "C" and is placed inside a groove 114 in the seat member 108 bottom surface. Preferably, the open part of the C-shape seal ring 112 faces away from the bore 126 centerline A-B, as shown.

The metal seal ring 112 comprises a unidirectional seal and is designed such that it does not seal any pressure on the upstream side, e.g., at 112a, and will allow the well-bore fluid to bleed into the body cavity 116 quickly and easily on the upstream or "a" side. After the body cavity 116 is filled with fluid, the gate 104 is forced downstream towards 108b, 106b and 102b to obtain a seal. The metal seal ring 112b on the downstream "b" side takes into effect, and seals the fluid pressure, preventing fluid from entering well bore 126b and providing a downstream seal. Metal C-ring 112 is designed such that it has enough spring-back to hold smaller pressures such as 200 psi downstream as well as hold the full working pressure of the valve, which may be up to about 20,000 psi, as examples.

Preferably, a bottom seal ring 118 and a top seal ring 122 are coupled between each pocket insert 106 and each valve body 102 pocket 110. The pocket insert 132 preferably comprises two annular grooves 120 and 124 adapted to accommodate seal rings 118 and 122, respectively, and provide a seal. Groove 120 is formed in the bottom surface of the pocket insert 106 proximate the bore 126, and groove 124 is formed at the exterior corner of the L-shaped cross-section of the pocket insert 106, as shown. Preferably, seal rings 118 and 122 comprise spring-energized seals, which are unidirectional and have a memory or spring-back action.

Seal rings 118 and 122 preferably include an outer high-temperature plastic U-shaped body comprising of carbon-filled carbon-filled polytetrafluoroethylene (PTFE), for example. Alternatively, U-shaped seal rings 118 and 122 may comprise polyetheretherketone (PEEK) or polyethersulfone (PES), as examples.

The open end of the U-shape bottom seal ring 118 faces towards the bore 126 centerline A-B, preventing fluid from entering the space between the valve body pocket 110a and pocket insert 106a (and thus the body cavity 116) on the upstream side. The open part of the top U-shape seal ring 122 faces toward the gate engaging member 104 to provide an annular seal between the valve body pocket 110b and the pocket insert 106b, thus preventing fluid from entering the bore 126b on the downstream side. Preferably, the groove 124 in the pocket insert 106 is located at the exterior pointed corner of the L-shaped cross-section of the pocket insert 106, so that the top seal ring 122 may exert a radial force R between the pocket insert 106 and an inner radius 142 of the valve body pocket 110. Due to the radial force R exerted by the spring 122, the top seal ring 122 also functions as a self-retaining ring to retain the pocket insert 106 within the valve body pocket 110.

The seal rings 118 and 122 also preferably comprise an inner spring member coupled to the high temperature plastic body adapted to exert a force outwardly against the upward legs of the U-shaped body and provide a seal against an inner surface of pocket insert grooves 120 and 124, respectively. The inner spring member preferably comprises an alloy such as Elgiloy, and alternatively may comprise other metals, for example. Preferably, seal rings 118 and 122 have a width that is greater than the width of the grooves 120 and 124 by about 0.015" to ensure a sufficient seal within the grooves 120 and 124.

Preferably, optional support rings 138 and 140 are disposed within U-shaped seal rings 118 and 122, respectively, as shown, to help prevent rotation, displacement or collapse of the U-shaped seal rings 118 and 122. Preferably, support rings 138 and 140 are comprised of a heat-resistant thermoplastic such as polyphenol sulfide (e.g., Ryton™), for example. Preferably, support ring 138 comprises a split ring for ease of installation within the seal ring 118. Support ring 140 preferably is one-piece continuous design having no slit, as it can be slid easily within the open lips of the seal ring 122. Preferably, support rings 138 and 140 do not provide a seal, but are used primarily for mechanical support.

The support ring 140 preferably sits loose within groove 124 and seal ring 122. The support ring 140 preferably does not impose a force on the seal ring 122 in a normally assembled position. More particularly, the support ring 140 preferably does not force the seal ring 122 against the back-up seal ring 152 (to be described further herein) in order to energize the seal ring 122 or to keep the assembly of the seal ring 122, back-up seal ring 152 and support ring 140 stacked tight within the groove 124 to create a tight fit in the entire stack up (including the gate 104, seat members 108 and pocket inserts 106) within the body pocket 110. Rather, the support ring 140 preferably prevents the collapse of the seal ring 122 against back pressure of fluid entering the valve seal assembly 100.

Support rings 138 and 140 permit the lip of the seal rings 118 and 122 to deflect to relieve the pressure if for some reason pressure enters into the space between the seal rings 118 and 122, ensuring a seal is made and is maintained even under high pressure. Thus, the support rings 138 and 140 ensure that the U-shaped seal rings 118 and 122 function as unidirectional seals, and prevent U-shaped seal rings 118 and 122 from extruding and collapsing the internal springs when subjected to pressure at the heel of the seal. When the seal rings 118 and 122 are subjected to pressure from back side of the "U", the seal rings 118 and 122 do not hold any pressure, as the lips of the seal rings 118 and 122 deflect inward and allow the pressure from behind to pass and relieve. Thus, the collapse of the seal rings 118 and 122 is prevented.

An optional back-up seal ring 152 may be disposed between the valve body pocket 110 and the radial seal ring 122, as shown in FIG. 2, which shows a more detailed view of the exterior corner region 150 of the L-shaped pocket insert 106 of FIG. 1. The exploded view of region 150 in FIG. 2 depicts a more detailed view of components in region 150 on both the "a" and "b" side of the valve seal assembly 100, although the "a" and "b" in the reference numbers for the elements are omitted in FIG. 2. The back-up seal ring 152 prevents any possibility of extrusion of the seal ring 122. When seal ring 122 is pressurized, the back-up seal ring 152 supports the pressurized seal ring 122. The back-up seal ring 152 is preferably maintained within a 0.002" to 0.003" diametric clearance. For example, clearances $C_1$ and $C_2$ range from 0.001" to 0.0015" to the pocket insert groove and seat pocket diameter, as shown FIG. 2. The back-up seal ring 152 may comprise a metal or non-metal such as steel, fluoropolymer resin, polyphenol sulfide, PEEK, PES, PTFE, or combinations thereof, as examples.

Referring again to FIG. 1, the seal rings 112, 118 and 122 may comprise other types of seals according to embodiments of the invention. For example, seal rings 118 and 122 may comprise a C-shaped ring such as the one preferably used for seal ring 112, and the C-shaped seal rings 118 and 122 may be comprised of a metal, for example. Seal ring 118 may comprise a solid annular metal or fluoropolymer resin ring, for example. Seal ring 112 may comprise a square cross-sectional solid ring comprised of fluoropolymer resin, for example. C-shaped seal ring 112 may alternatively comprise a U-shaped ring as shown for 118 and 122, for example.

In accordance with an embodiment of the invention, because the top seal ring 122 acts as a retainer, a separate retainer ring is not required between the pocket insert 106 and the valve body pocket 110. Likewise, a groove in the pocket insert 106 to accommodate such an additional retainer ring is not required. Thus, embodiments of the present invention provide technical advantages by reducing the number of components and processing steps (e.g., to form the groove and insert a retainer ring) of the valve seal assembly 100, reducing the cost of manufacturing the valve seal assembly 100.

In accordance with one embodiment of the invention, an optional retainer ring or retaining ring 128 may be positioned at the exterior annular surface of the seat member 108 abutting the inner surface of the pocket insert 106. In this embodiment, the seat member 108 includes an exterior annular groove 130 adapted to accommodate the retaining ring 128. The retaining ring 128 preferably comprises a fluoropolymer resin having a square or rectangular cross-section, as examples, and alternatively, the retaining ring 128 may comprise metal, as examples. The optional retaining ring 128 does not provide a seal, but rather, is preferably split to allow fluid to flow around the retaining ring 128. The retaining ring 128 is slightly oversized e.g., by about 0.002" with respect to the groove 130 depth to exert a force towards the pocket insert 106 in order to retain the seat member 108 within the pocket insert 106 in any position of the valve 100, including the vertical position.

In accordance with an embodiment of the invention, one of the seat members 106 or 108 includes a built-in annular lip 132 at the inner annular surface along the bore 126 that functions to prevent solids such as mud, sand, dirt, and rocks, for example, from entering the valve body cavity 116. For example, in FIG. 1, a built-in lip 132 is shown on the seat member 108, although alternatively, the built-in lip 132 may be disposed on the pocket insert 106, not shown. In the embodiment shown, the pocket insert 106 includes an annular groove 134 adapted to accommodate the seat member built-in lip 132. (Alternatively, the annular groove 134 may be disposed on the seat member 108, if the built-in lip 132 is disposed on the pocket insert 106, not shown). The built-in lip 132 prevents debris from entering the space between the pocket insert 106 and the seat member 108. To further prevent debris from entering the space between pocket insert 106 and seat member 108, the built-in lip 132 and groove 134 may be designed to have a narrower space between them at the lip 132 than near the bore 126.

The valve sealing assembly 100 is adapted to seal in the downstream direction, e.g. at the "b" side. A description of the sealing mechanism will next be described. When fluid enters from the upstream side into the borehole 126a, fluid is prevented from passing by seal ring 118a, which U-shaped seal ring 118a has legs that exert a force outwardly against pocket insert 106a groove 120a and against valve body pocket 110a. Fluid passes by C-shaped seal ring 112a because the "C" opening faces upward away from the bore 126a, and fluid enters between pocket insert 106a and seat member 108a into cavity 116. Fluid flows within the "a" side in body cavity 116 to the downstream "b" side. By this time, the fluid pressure typically will have built up to a sufficient amount to compress the following elements against one another, laterally from left to right, as drawn: the valve body 102a, pocket insert 106a, seat member 108a, gate 104, seat member 108b, pocket insert 106b and valve body 102b. A downstream seal is formed at the interface of pocket insert 106b and valve body 102b pocket 110b by seal ring 122b and at the interface of pocket insert 106b and seat member 108b by seal ring 112b, preventing the flow of fluid into the downstream borehole 126b.

The bottom seal ring 118a prevents the passage of wellbore fluid from the upstream "a" side between the valve body pocket 110a and the pocket insert 106a, therefore preventing erosion and corrosion of the valve body pocket 110a. The top seal ring 122a functions as a retaining ring to retain the pocket insert 106 within the valve body 102 regardless of the position of the valve seal assembly 100, e.g., during servicing, for example.

The valve seal assembly 100 is bi-directional and symmetric, and will provide a seal in either direction. For example, during oil production, fluid flowing from the upstream direction will cause the assembly 100 to seal at the downstream side when the gate is closed. During testing, e.g., when fluid is flown from the downstream side, the assembly 100 will seal on the upstream side. In other words, the seal assembly 100 will seal on the opposite side of the pressure source.

The valve seal assembly 100 is preferably also designed so that when pressure is bled from the line bore 126, the pressure releases from the body cavity 116, passing the metal seal 112a on the upstream side between the seat 108a and pocket insert 106a.

The metal seal ring 112 is preferably made out of a mechanically alloyed metal such as Inconel™ made by Inco Alloys International, Inc., which is chemically inert to most well-bore fluids and has a high temperature strength, corrosion and fatigue resistance. Being a metal ring, seal ring 112 retains its physical properties such as spring-back better than other non-metallic seals.

FIG. 3 illustrates an embodiment of the present invention that is similar to the embodiment shown in FIG. 1. Corresponding element numbers in FIGS. 1 and 3 refer to corresponding elements and as such, a duplication of description of the elements will be avoided. The embodiment shown in FIG. 3 does not include the optional support rings 138 and 140 for seal rings 218 and 222, and does not include the optional built-in lip 132 and accommodating recess 134 for the lip 132, for example.

In each of the preferred embodiments described herein, advantageously, the pocket insert 106 and 206 are fixed within the valve body pockets 110 and 210. Because the pocket insert and valve body pocket insert interface is fixedly sealed, fluid does not enter between the pocket inserts 106a and 206a and valve body pockets 110a and 210a. This prevents erosion of the valve body pockets 110a and 210a. Fluid enters into cavities 116 and 216 through the cavity between the seat members 108a and 208a and the pocket inserts 106a and 206a on the upstream "a" side. The pocket inserts 106a and 206a comprise sacrificial elements that are subject to erosion, rather than the valve body pockets 108a and 208a being subject to erosion, as in prior art designs. The pocket inserts 106 and 206 may be fixedly retained within valve body pockets 110 and 210 by seal rings 122 and 222, which function both as seals and as retainer rings, or alternatively, the pocket insert 106 and 206 dimensions may be designed to press-fit into the valve body pockets 110 and 210 with an interference fit.

The annular grooves 114, 120, 124, 134, 214, 220, and 224 and built-in lip 132 described herein are preferably machined, as will be understood by one skilled in the art. For example, computer numerically controlled (CNC) programming may be used to machine the seat members 108 and 208 and pocket inserts 106 and 206. Alternatively, the grooves 114, 120, 124, 134, 214, 220, and 224 and built-in lip 132 may be molded-in, for example.

Some advantages of embodiments of the invention will next be described. Preferably, non-elastomeric seals are used for seal rings, avoiding the problems associated with elastomers such as explosive decompression, and the elaborate selection procedure required of elastomers for a particular service (e.g., $H_2S$, $CO_2$, methanol), high temperature and high pressure applications. The metal seal C-rings 112 and 212 allow fluid to enter the valve cavities 116 and 216 from the pipeline bores 126 and 226 during pressure applications, and equally allows the pressure in the cavity to bleed with the pipeline bores 126 and 226.

Embodiments of the present valve seal assembly 100 prevent the passage of well bore fluid proximate the body pocket 110, yet allow fluid to pass between seat member 108 and pocket insert 106, which are sacrificial components, and thus protect the body pocket 110 from corrosion and erosion. Because embodiments of the present pocket insert 106 are sacrificial components, the expensive process of Inconel™ inlaying of the body pockets 110 can be avoided.

Embodiments of the present invention allow equilibrium inside the gate valve body cavity 116, preventing any damage to its sealing mechanism and components, even in subsea applications where a valve assembly can be subjected to working pressure plus hydrostatic pressure, which can be detrimental to seals.

Well bore pressure assistance is designed-in as a default and for fail-safe design applications, no additional drilling of holes or gate modifications are necessary in accordance with embodiments of the present invention.

Embodiments of the invention utilize a floating gate 104 with a T slot (not shown), which allows the gate to float in the direction of the well bore pressure and helps to maintain a flat sealing surface between gate 104 and seat members 108a and 108b.

Other advantages of embodiments of the invention include providing a seat member built-in lip 132 and accommodating groove 134 on pocket insert 106. This feature is beneficial to any valve sealing assembly having telescoping parts, for example. The built-in lip 132 prevents debris from entering the space between the pocket insert 106 and seat member 108, lengthening the life of pocket insert 106, seat member 108 and any seals 112 and 128 therebetween. Valve malfunction may be prevented by the use of the built-in lip 132.

The retaining ring 128 is advantageous in retaining the seat member within the pocket insert, even when the valve is placed in the vertical position. The valve may be repaired or serviced in the vertical position by the use of the retaining rings 128 and 122.

Although embodiments of the invention are described herein for use with gate valves, it is anticipated that the novel concepts described herein are beneficial in other valves for down-hole drilling pipes such as plug valves, for example. Other valves having rotating, reciprocating, sliding or otherwise moving elements or valve engaging members would benefit from the present seal assembly described herein, as examples.

Although embodiments of the present invention and their advantages have been described in detail, it should be understood that various changes, substitutions and alterations can be made herein without departing from the spirit and scope of the invention as defined by the appended claims. For example, it will be readily understood by those skilled in the art that many of the features, functions, processes, and materials described herein may be varied while remaining within the scope of the present invention. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A seal assembly for a gate valve, the valve including a valve engaging member and a valve body, the valve body having a first pocket, the valve body first pocket having a first inner radius, the seal assembly comprising:

a first pocket insert disposed within the valve body first pocket, the first pocket insert being annular and having an L-shaped cross-section;

a first seat member disposed telescopingly within the first pocket insert, the first seat member being adjacent the valve engaging member;

a first annular groove disposed at an exterior corner of the L-shaped cross-section of the first pocket insert proximate the first inner radius of the valve body first pocket; and a first radial seal ring disposed within the first annular groove of the first pocket insert adjacent the first inner radius of the valve body first pocket, wherein the first radial seal ring provides a radial seal between the first pocket insert and the first inner radius of the valve body first pocket.

2. The seal assembly according to claim 1, wherein the valve body comprises a second pocket, the valve body second pocket having a second inner radius, further comprising:

a second pocket insert disposed within the valve body second pocket, the second pocket insert being annular and having an L-shaped cross-section;

a second seat member disposed telescopingly within the second pocket insert, the second seat member being adjacent the valve engaging member;

a second annular groove disposed at an exterior corner of the L-shaped cross-section of the second pocket insert proximate the second inner radius of the valve body second pocket; and a second radial seal ring disposed within the second annular groove of the second pocket insert adjacent the valve body second pocket, wherein the second radial seal ring provides a radial seal between the second pocket insert and the second inner radius of the valve body second pocket.

3. The seal assembly according to claim 2, wherein the first radial seal ring retains the first pocket insert within the first inner radius of the valve body first pocket, and wherein the second radial seal ring retains the second pocket insert within the second inner radius of the valve body second pocket.

4. The seal assembly according to claim 2, wherein the first radial seal ring and the second radial seal ring comprise U-shaped seal rings, wherein the open end of the U-shaped seal rings face the valve engaging member.

5. The seal assembly according to claim 4, wherein the first radial seal ring and the second radial seal ring comprise carbon-filled polytetrafluoroethylene (PTFE), polyeheretherketone (PEEK), polyethersulfone (PES), metal, or combinations thereof.

6. The seal assembly according to claim 4, further comprising a support ring disposed within each of the U-shaped first and second radial seal rings.

7. The valve sealing assembly according to claim 6, wherein the support rings comprise polyphenol sulfide and are continuous.

8. The seal assembly according to claim 1, wherein the L-shaped first pocket insert comprises a bottom surface and the first seat member comprises a bottom surface, further comprising:

a third annular groove disposed within the bottom surface of the L-shaped first pocket insert;

a first seal ring disposed within the third annular groove between the valve body first pocket and the first pocket insert;

a fourth annular groove disposed within the bottom surface of the first seat member; and a second seal ring disposed within the fourth annular groove between the first pocket insert and the first seat member.

9. The seal assembly according to claim 8, wherein the first seal ring comprises a U-shaped seal ring, wherein the open end of the U-shaped seal ring faces towards a bore of the valve body, and wherein the second seal ring comprises a C-shaped ring, wherein the open end of the C-shaped ring faces away from the bore of the valve body.

10. The seal assembly according to claim 1, wherein the first seat member comprises a side surface, further comprising:

a fifth annular groove disposed in the side surface of the first seat member; and a retaining ring disposed within the fifth annular groove between the first seat member and the first pocket insert.

11. The seal assembly according to claim 1, further comprising:

a built-in lip disposed on one of the first seat member or the first pocket insert; and a lip-accommodating groove on one of the first pocket insert or the first seat member.

12. The seal assembly according to claim 1, further comprising a back-up seal ring disposed between the valve body first pocket and the first radial seal ring.

13. A seal assembly for a gate valve, the valve including a valve engaging member and a valve body, the valve body having a first pocket and a second pocket, the seal assembly comprising:

a first pocket insert disposed within the valve body first pocket, the first pocket insert being annular and having an L-shaped cross-section and a bottom surface;

a first seat member disposed telescopingly within the first pocket insert, the first seat member being adjacent the valve engaging member and having a bottom surface;

a first annular groove disposed at an exterior corner of the L-shaped cross-section of the first pocket insert;

a first radial seal ring disposed within the first annular groove of the first pocket insert adjacent the valve body first pocket, wherein the first radial seal ring provides a radial seal between the first pocket insert and the valve body first pocket;

a second pocket insert disposed within the valve body second pocket, the second pocket insert being annular and having an L-shaped cross-section and a bottom surface;

a second seat member disposed telescopingly within the second pocket insert, the second seat member being adjacent the valve engaging member and having a bottom surface;

a second annular groove disposed at an exterior corner of the L-shaped cross-section of the second pocket insert;

a second radial seal ring disposed within the second annular groove of the second pocket insert adjacent the valve body second pocket, wherein the second radial seal ring provides a radial seal between the second pocket insert and the valve body second pocket;

a third annular groove disposed within the bottom surface of the L-shaped first pocket insert;

a first seal ring disposed within the third annular groove between the valve body first pocket and the first pocket insert;

a fourth annular groove disposed within the bottom surface of the first seat member;

a second seal ring disposed within the fourth annular groove between the first pocket insert and the first seat member;

a fifth annular groove disposed within the bottom surface of the L-shaped second pocket insert;

a third seal ring disposed within the fifth annular groove between the valve body second pocket and the second pocket insert;
   a sixth annular groove disposed within the bottom surface of the second seat member; and
   a fourth seal ring disposed within the sixth annular groove between the second pocket insert and the second seat member.

14. The seal assembly according to claim 13, wherein the first radial seal ring retains the first pocket insert within the valve body first pocket, and wherein the second radial seal ring retains the second pocket insert within the valve body second pocket.

15. The seal assembly according to claim 13, wherein the first radial seal ring and the second radial seal ring comprise U-shaped seal rings, wherein the open end of the U-shaped seal rings face the valve engaging member.

16. The seal assembly according to claim 15, wherein the first radial seal ring and the second radial seal ring comprise carbon-filled polytetrafluoroethylene (PTFE), polyetheretherketone (PEEK), polyethersulfone (PES), metal, or combinations thereof.

17. The seal assembly according to claim 15, further comprising a support ring disposed within each of the U-shaped first and second radial seal rings.

18. The valve sealing assembly according to claim 17, wherein the support rings comprise polyphenol sulfide and are continuous.

19. The seal assembly according to claim 13, wherein the first seal ring and the third seal ring comprise U-shaped seal rings, wherein the open end of the U-shaped seal rings face towards a bore of the valve body, and wherein the second seal ring and the fourth seal ring comprise C-shaped rings, wherein the open end of the C-shaped rings face away from the bore of the valve body.

20. The seal assembly according to claim 19, further comprising a support ring disposed within each of the U-shaped first seal ring and third seal ring, wherein the support rings have a slit therein.

21. The seal assembly according to claim 13, further comprising a first back-up seal ring disposed between the valve body first pocket and the first radial seal ring, and a second back-up seal ring disposed between the valve body second pocket and the second radial seal ring.

22. The seal assembly according to claim 13, wherein the first seat member and the second seat member each comprise a side surface, further comprising:
   a seventh annular groove disposed in the side surface of the first seat member;
   a first retaining ring disposed within the seventh annular groove between the first seat member and the first pocket insert;
   an eighth annular groove disposed in the side surface of the second seat member; and
   a second retaining ring disposed within the eighth annular groove between the second seat member and the second pocket insert.

23. The seal assembly according to claim 13, further comprising:
   a first built-in lip disposed on one of the first seat member or the first pocket insert;
   a first lip-accommodating groove on one of the first pocket insert or the first seat member;
   a second built-in lip disposed on one of the second seat member or the second pocket insert; and
   a second lip-accommodating groove on one of the second pocket insert or the second seat member.

* * * * *